J. JONES.
Bee Hive.
No. 2,618.
Patented May 12, 1842.
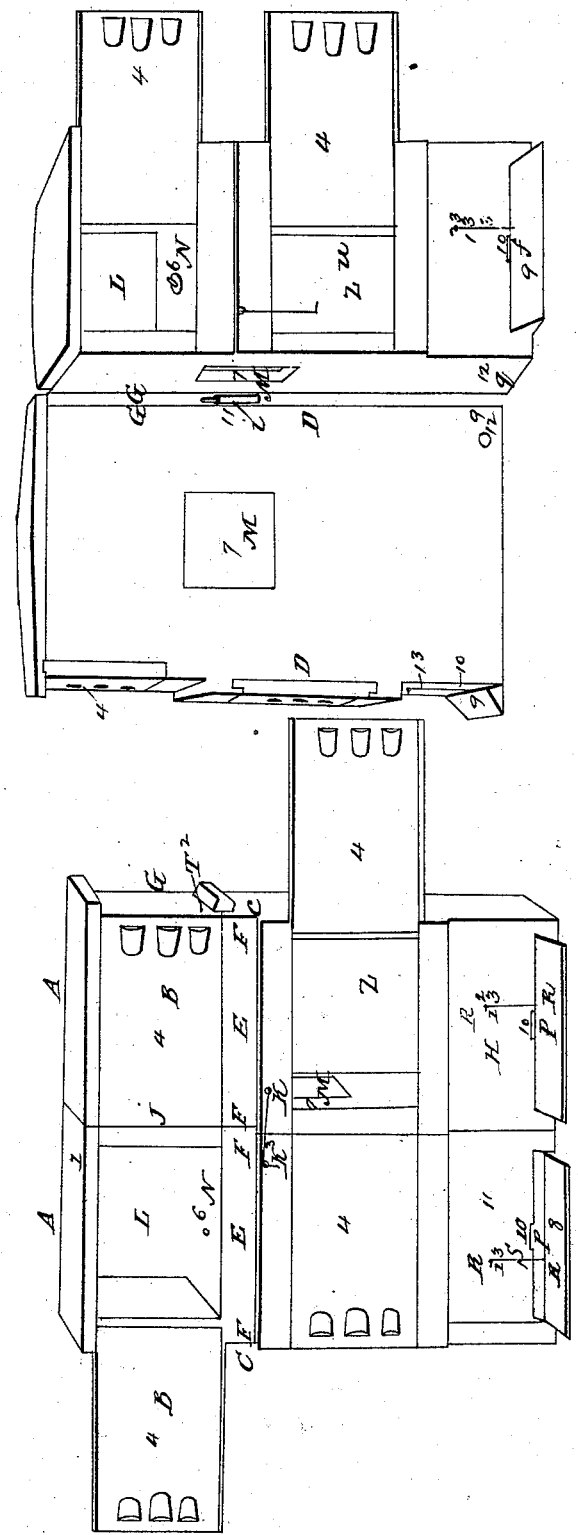

UNITED STATES PATENT OFFICE.

JAMES JONES, OF GALWAY, NEW YORK.

BEEHIVE.

Specification of Letters Patent No. 2,618, dated May 12, 1842.

*To all whom it may concern:*

Be it known that I, JAMES JONES, of Galway, in the county of Saratoga and State of New York, have invented a new and Improved Mode of Multiplying and Equalizing Swarms of Bees to Any Extent Without the Usual Process of Swarming; and I do hereby declare that the following is a full and exact description.

The nature of my invention consists in the construction of a beehive of two equal and distinct parts, which, when joined together, form one complete hive, enabling the apiarian to form two hives of one full and one empty hive, by taking apart the two halves, and adapting to each other a full and an empty half, thus forming of one swarm two swarms of bees which will continue their labors in each as well as swarms produced by the natural process of swarming, and which may be continued through the swarming season as often as they are full. By this method one half of the bees, and one half of the comb, are taken from the full hive; in the swarming hive (commonly used) two-thirds or more of the bees are taken, and none of the comb, which leaves the remaining bees a great amount of labor to keep the moth out of the comb. The injury is produced solely by the moth hatching in the comb; the miller enters and deposits its eggs in the comb when it is bare; the brood thus hatched eat through the comb, and spin their web after them thereby destroying the hive.

It is a well-known fact that the moth cannot destroy a stock of bees that are strong, for the plain reason that the miller cannot get to the comb to deposit its eggs, it being always covered with bees. This is always the case in the equalizing hive. And thus the great enemy to the culture of the honey bee is effectually defeated.

The division as described saves the ordinary labor of swarming bees and of watching them to prevent their flight to the woods, which cannot, on all occasions, even with the greatest attention, be prevented. The bees sometimes leave the hive after being hived four days, and are totally lost. Again if any number of swarms come from their respective hives at the same time, or within fifteeen or twenty minutes of each other they will light together and be lost except the number sufficient to make a good-sized swarm.

The loss of labor of the bees about swarming time in using the swarming hive may seem a small item, but when rightly considered, appears in a different light. Suppose the time the bees work to be eight weeks, and that seven-eighths of the bees lie out two weeks without working, and so clogging the entrance to the hive as to prevent others from performing any amount of labor, and waiting for a queen to lead them out; it would appear thus that two weeks of the best of the season are almost entirely sacrificed. It is also of very frequent occurrence in swarming hives, that many large and strong swarms lie out through the entire swarming season, and of course do not swarm at all. Taking a length of time into account, the profit in the number of hives in the use of the equalizing hive, is always double of that in using the swarming hive. Possibly in one particular year there may be extra success in procuring swarms from the swarming hive, but the following year there might not be got many swarms, and probably, as often happens, not half the number of old hives.

I have been thus minute and particular in noticing some of the evils that occur in swarming hives, that it may more easily be seen how, in the equalizing hive, they are completely remedied.

To enable others skilled in the art to make and use my invention, I will proceed to describe its construction and operation.

I construct my hive twenty-one inches high, including the cap, which is one inch thick and projects over the body of the hive one inch all around. The cap is made of two pieces fourteen inches long, and ten and a half inches wide each. To receive the upper edge of the chamber-slide, I cut a groove in the underside, and near the front end; this groove is three eighths of an inch wide, and one fourth of an inch deep. One side of this groove is two inches back of the front of the cap, and the front side of the groove is one inch and five eighths from the front end of the cap, making the grooves three eighths of an inch wide. The two pairs forming the cap are shown by A, A, in the accompanying drawings.

The chamber doors are five and a half inches wide on the front side; but in consequence of being grooved into the cap above, and front piece below, one fourth of an inch each edge, they are six inches wide on the back side. The length of the doors is nine and one half inches; their thickness is one inch, or less, as they must correspond with the thickness of the material which composes the body of the hive. The doors are shown by the letters B, B. The whole width of the hive is nineteen inches; each half or compartment being nine and a half inches wide. The whole width of the hive is shown by the letters C, C. The depth of the hive from front to rear, is twelve inches, and is shown by the letters D, D. The hive is composed of two equal compartments; so as to be taken apart laterally; separating the brood, and thus making two swarms of one, by adding an empty half to each full one. The two compartments are shown by the letters E, E. There are two end pieces for each compartment. They are twenty inches long, and twelve inches wide, each. There is a notch cut in the front edge and upper end of each of said pieces, as wide as the chamber doors, and as deep as the thickness of those doors, leaving them even with the front part of the hive. The four end pieces are shown by the letters F, F, F, F. There are two back pieces, which are of the same length as the end pieces. They are seven and a half inches wide. The back pieces are not lettered on the pieces, inasmuch as they form the back part of the hive. But the letters G, G, placed on the draft are as near them as the end view will permit. The front pieces of the hive, are seven and a half inches wide, each, or the same width as the back pieces; they, like the back pieces of the hive, are placed between the end pieces, and commence against the chamber doors, which being grooved into them in such a manner as to leave the outside of the door and front piece even. These front pieces reach within one inch of the bottom of the ends of the hive; and thus leaving room for the bottom pieces of the hive to be placed between them and to run back to the back pieces. The front pieces are shown by the letters H, H.

The above described compartments forming the hive are made fast on the back part or back side of the hive by a loose or blind butt. This butt is put on perpendicularly half way from the underside of the cap, always measuring from the center of the butt. This will place the butt the long way, or where it separates, ten inches below the cap. This must be put on all the hives alike, so that when they are separated and reunited with other halves they will fit truly. These compartments are made fast in front, with an iron hook which, is made fast on the right hand compartment by inserting a screw or staple, and hooked over a screw or a staple, in the other compartment. The butt is shown by the letter I, and the hook in front, with screws or staples which constitute the front fastening; is shown by the letters K, K. There is a chamber in the upper end of each compartment, five and half inches in clear perpendicular. In width, or from side to side, they are seven inches and a half each, and in depth, or from front to rear, ten inches each. The chambers are shown by the letters L, L. The chambers are closed by the above described chamber doors, which slide outward and close to the center. Letter J, shows one strut. The other is open. These chambers are for the insertion of wooden, or glass, drawers, in which to abstract surplus honey. This is done by placing empty drawers in the chambers, and as often as they are filled, they may be removed, and replaced by other empty ones. I have no particular rule for constructing drawers: they may be made as the maker pleases. There is an opening in each chamber, which must correspond to the opening in the drawers two inches in diameter. This opening is made through the chamber floor, and communicates directly with the bees below. The chamber floors are two in number. They are ten inches long, and seven and a half inches wide each and one inch thick. The underside of the chamber floor should not be planed. The chamber floors are shown by the letters N, N. Entrances through the floors are shown by letters O, O. Through each of the two compartments is an opening, which enables the bees to occupy the two compartments as one hive. This opening is made by drawing two lines horizontally across the two compartments on the two ends that join to each other. The first line is six and a half inches below the cap. The other line four inches below the first. Then draw two perpendicular lines, one four inches from the rear of the hive, and the other four inches from the front on the said ends. Thus you will surround the piece to be cut out at right angles. This will make the top of the opening even with the bottom of the chamber floors. This opening is shown by the letters M, M. The two bottom pieces of the hive are thirteen inches long and seven and a half wide each. They move up and down between the end pieces of the hive. They are placed firmly against the back of the hive. The back end is hung by two screws, or pins, operating as a hinge, through the end pieces near the back end. The back end of the bottom may be raised to give it any inclination the maker chooses. The screws that form the hinge for the bottom piece, should enter it five eighths of an inch from the back end of said pieces, as shown by the letters Q, Q. The fore end of said pieces is hung with wire hooks, made fast to the bottom pieces by wire staples. Put two screws in each front, one half an inch above the other. The hook must be of sufficient length when hooked to the top screw to close the bottom of the hive; except the small entrance which cannot be closed by raising the bottom, because the entrance is made by cutting a notch in the bottom end of each front piece, one inch wide and one-fourth of an inch deep. The small entrances are shown by the letters P, P. Their object is to prevent the bees from robbing. When the hive is attacked by robbers, close the hive, except the small entrance.

R, R, shows the wire hooks that hang the front end of the bottoms.

S, S, shows the screws on which the tops of the hooks are suspended. The hive is hung or suspended by two cleats, running horizontally across the ends of the hive. The bottom of these cleats are six and a fourth inches below the cap, and one is shown by the letter T. The cleat covered by the chamber door is on the other end of the hive, directly opposite the one shown by the letter T.

In the front of each compartment, is a window, through which may be seen the bees at work. The window may be made any size the maker pleases, and darkened by slides operating the same way as the chamber slides, except that they move on the outside of the front pieces. The windows are shown by the letters Z, Z.

The multiplying hive is divided during the swarming season as often as it is full of bees and comb, by inserting two tin slides between the two compartments to cut off intercommunication from one to four days previous to the actual division of the hive. The division itself must take place when all of the bees are in the hive, early in the morning or in the evening. The hive being taken down, and the two compartments separated, each is united anew to an empty half, and the two new hives, thus formed from an empty and full one, are then hung up, care being taken to draw the slides and place the new hives, six or eight feet from the original position.

What I claim as my invention and improvement, and desire to secure by Letters Patent, is—

The adapting together two halves of a hive, constructed according to the above specification, or in any similar convenient form, so that the same may be taken apart, and each adapted to, and connected with, an empty half of a hive, for the purpose of separating one swarm of bees, and their honey or products, into two, to prevent the trouble and risk of their swarming, and the injury or loss of the bees.

JAMES JONES.

Witnesses:
HUGH ALEXANDER,
E. O. SMITH.